United States Patent
Buttgen et al.

(10) Patent No.: US 8,420,189 B2
(45) Date of Patent: Apr. 16, 2013

(54) METHOD FOR THE PRODUCTION OF A SEALING COVER AND SEALING COVER PRODUCED BY SAID METHOD

(75) Inventors: Heinz Buttgen, Bad Krozingen (DE); Heidi Owegeser, Lachen (CH); Tilo Callenbach, Jona (CH)

(73) Assignee: Weidmann Plastics Technology AG, Rapperswil (CH)

( * ) Notice: Subject to any disclaimer, the term of this patent is extended or adjusted under 35 U.S.C. 154(b) by 1122 days.

(21) Appl. No.: 10/487,038

(22) PCT Filed: Aug. 14, 2002

(86) PCT No.: PCT/CH02/00445
§ 371 (c)(1),
(2), (4) Date: Aug. 23, 2004

(87) PCT Pub. No.: WO03/015918
PCT Pub. Date: Feb. 27, 2003

(65) Prior Publication Data
US 2005/0003144 A1     Jan. 6, 2005

(30) Foreign Application Priority Data
Aug. 16, 2001 (CH) ........................................ 1507/01

(51) Int. Cl.
*B32B 5/00* (2006.01)
*B32B 7/00* (2006.01)
(52) U.S. Cl.
USPC ............ 428/34.1; 215/305; 428/21; 428/172; 428/297.1

(58) Field of Classification Search ................. 428/34.1, 428/21; 215/305
See application file for complete search history.

(56) References Cited

U.S. PATENT DOCUMENTS

| | | | |
|---|---|---|---|
| 4,094,429 A * | 6/1978 | Urbin | 215/305 |
| 4,599,314 A | 7/1986 | Shami | |
| 5,035,859 A * | 7/1991 | Gu et al. | 422/28 |
| 5,282,543 A | 2/1994 | Keese et al. | |
| 5,957,822 A | 9/1999 | Bienhaus et al. | |
| 6,044,966 A * | 4/2000 | Haase | 206/5.1 |
| 6,136,273 A * | 10/2000 | Seguin et al. | 422/99 |
| 6,776,964 B1 * | 8/2004 | Wijnschenk et al. | 422/99 |
| 6,890,488 B2 * | 5/2005 | Mathus et al. | 422/99 |

FOREIGN PATENT DOCUMENTS

| | | |
|---|---|---|
| JP | 2227228 A | 9/1990 |
| JP | 8278312 A | 10/1996 |
| JP | 9188344 A | 7/1997 |
| WO | WO 87 01329 A | 3/1987 |
| WO | WO 01 17682 A | 3/2001 |

* cited by examiner

Primary Examiner — Brent O'Hern
(74) Attorney, Agent, or Firm — Sughrue Mion, PLLC

(57) ABSTRACT

The sealing cover (1) comprises a planar support (3), on which a number of sealing elements (4) are arranged, each of which is provided for the sealing of a sample container (2). The planar support (3) and the sealing elements (4) are produced from different materials in the same injection molding tool (21) by means of two-component injection molding. The planar support (3) is detachably connected to the sealing elements (4) by means of adhesion. The planar support (3) and the sealing elements (4) are preferably made from related plastics.

6 Claims, 3 Drawing Sheets

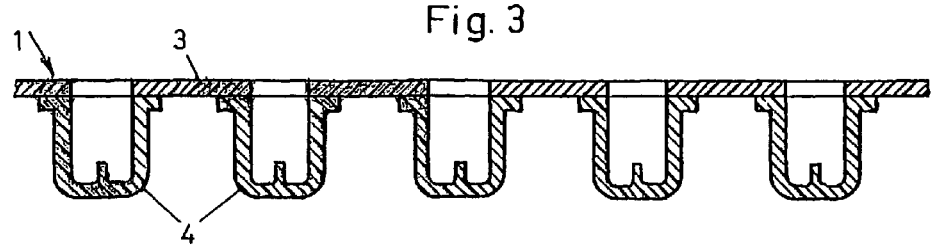
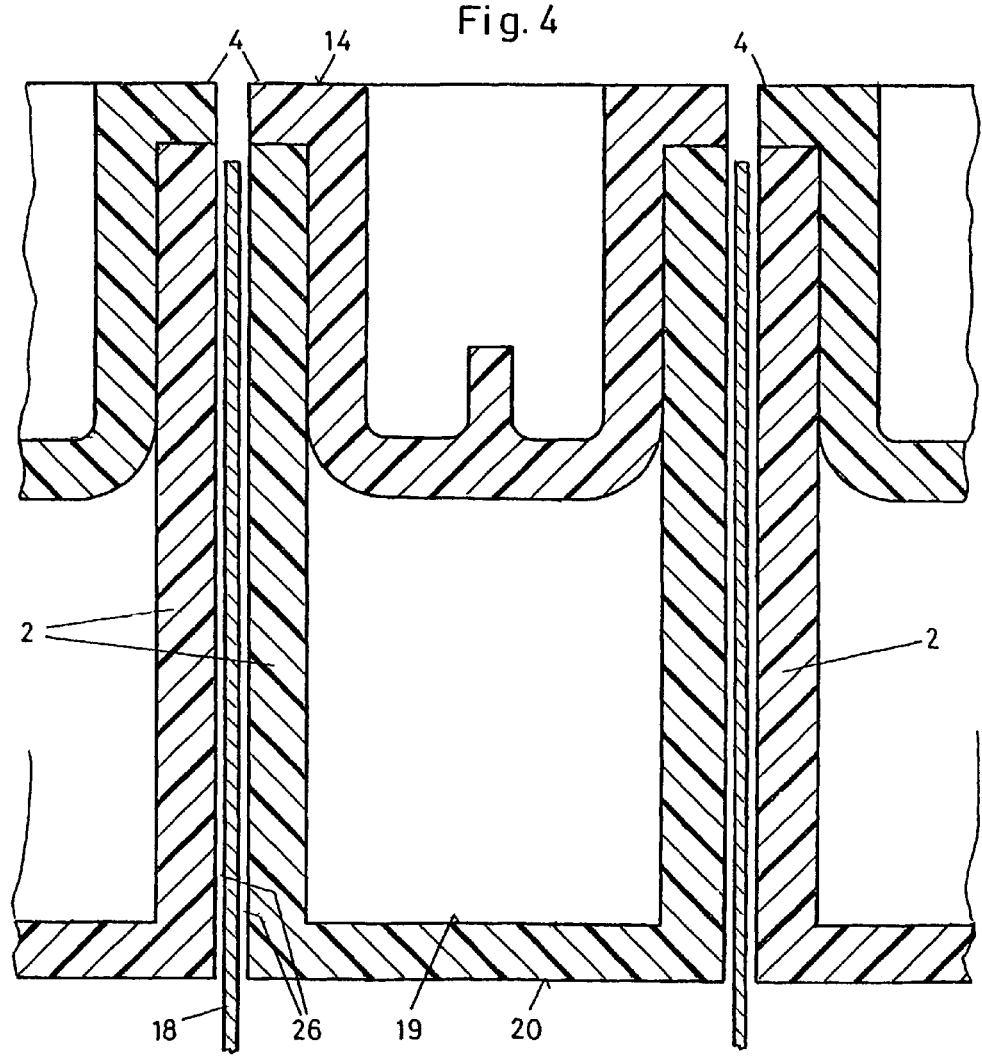

METHOD FOR THE PRODUCTION OF A SEALING COVER AND SEALING COVER PRODUCED BY SAID METHOD

BACKGROUND OF THE INVENTION

This invention relates to a method for producing a sealing mat having a carrier sheet on which a plurality of sealing elements are arranged, these elements being provided for sealing at least one test tube.

U.S. Pat. No. 5,282,543 discloses a sealing mat which consists of a carrier sheet on which a plurality of sealing elements is integrally molded. The carrier and the sealing elements are made of the same or different plastics. Test tubes sealed with this sealing mat are stored in a so-called rack. This makes it possible to seal several test tubes, e.g., 48 or 96 in one operation. This also makes it possible to open these test tubes comparatively quickly and easily by pulling off the sealing mat.

WO 01/17682 discloses a sealing mat with which the carrier sheet is detachably joined to the sealing elements. The test tubes which are also arranged in a rack are sealed with the sealing mat. The carrier sheet can be pulled away from the test tubes, with the sealing elements remaining on the test tubes and sealing them. This carrier is formed by a punched film made of a thermoset plastic. Each sealing element is mechanically attached to the carrier sheet. To this end, each sealing element has an outer and peripheral groove on an upper edge with the carrier sheet engaging in this groove. The manufacture of this sealing element is comparatively complex. First the carrier sheet must be manufactured and punched. Then the carrier sheet must be inserted into an injection molding machine and the sealing elements must be integrally molded on this carrier sheet.

The object of this invention is to create a method with which sealing elements can be manufactured less expensively in large numbers. The sealing mats produced by this method should be reliable in function and in shipping and should in particular make it possible to pull away the carrier sheet reliably.

SUMMARY OF THE INVENTION

In the inventive method, connections that are not mechanical but instead are based on an adhesive force are created between the carrier sheet and the sealing elements during the injection molding operation. This adhesive bonding strength can be established very precisely in a wide range by using plastics for the sealing elements and the carrier sheet such that both plastics have adequate wetting. The better the proximity of the molecules of the two bonding partners, the greater is the bonding between the carrier sheet and the sealing elements. The adhesive force between a sealing element and the carrier sheet can be adjusted accurately to the holding force of the sealing elements on the test tubes, so that when the carrier sheet is pulled away, the sealing elements remain securely in the test tubes, sealing them tightly. This avoids individual sealing elements being pulled out of the test tubes when the carrier sheet is pulled away.

One important advantage of the inventive method is regarded as being that the adhesive force between the carrier sheet and the sealing elements can be increased to such an extent that a tight bond is formed and thus an embodiment with non-detachable carrier sheets can be produced. The same injection molding machine may be used here. Only the plastics to be injected need be changed, but they may also be the same. In this case, one need only inject one plastic, and the sealing mat produced in this way is made in one piece of the same plastic. It is thus very simple to switch between production of sealing mats with detachable sealing elements and production of sealing mats with non-detachable sealing elements.

This invention also relates to a sealing mat produced by this method. With this mat, each sealing element has a flat connection at the upper edge on which the sealing elements are detachably joined to the carrier sheet by adhesive force. According to a refinement of this invention, this connection is formed by a flange directed radially outward. The connection is preferably situated on the top side of this flange.

After pulling off the carrier sheet, the sealing elements may be removed individually from the test tubes. This may be accomplished by machine, which is particularly simple when the sealing elements have an integrally molded nose on the bottom on the inside, such that this nose can be gripped with a suitable instrument.

Other advantageous features are derived from the following description and the drawing.

BRIEF DESCRIPTION OF THE DRAWINGS

An exemplary embodiment of this invention is described in greater detail below with reference to the drawing, in which:

FIG. 3 shows schematically a section through a part of the inventive sealing mat, FIG. 4 shows schematically a section through a part of a rack with the test tubes sealed and inserted into the rack

DETAILED DESCRIPTION OF THE EXEMPLARY EMBODIMENTS

Figure 1:
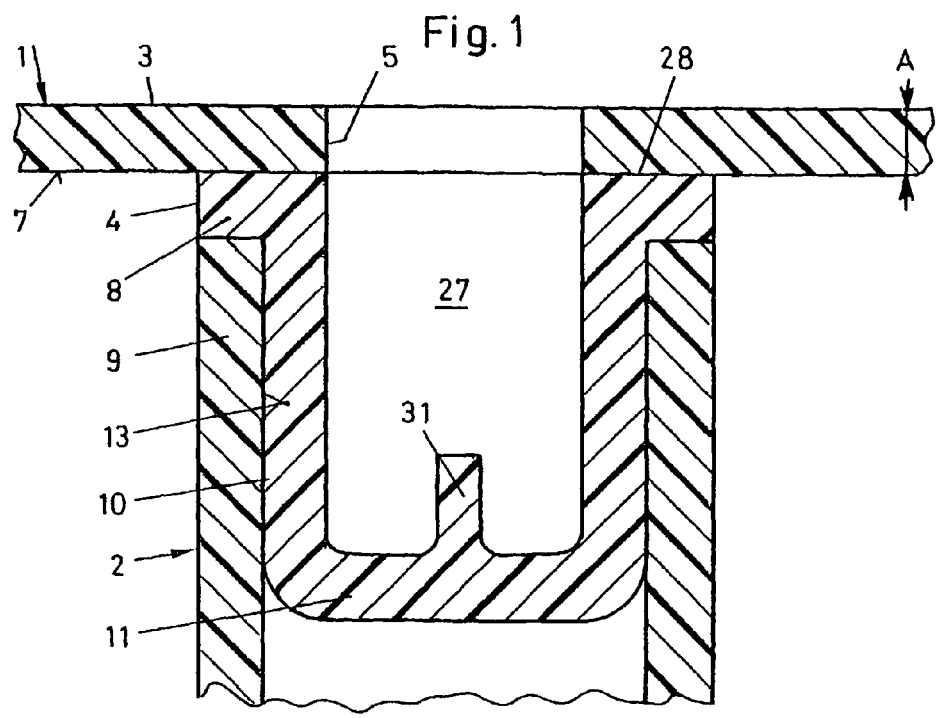
FIG. 1 shows schematically a section through a part of the inventive sealing mat.

The sealing mat 1 shown in FIG. 1 has a carrier sheet 3 which is manufactured from a flexible plastic and has a thickness A of approximately 1 mm or more. According to FIG. 3 a plurality of suppository-shaped sealing elements 4 is/are attached to a bottom side 7 of the carrier 3. The number of these sealing elements 4 which are arranged in regular rows amounts to 16, 48 or 96, for example. Essentially a greater or lesser number of such sealing elements 4 would also be conceivable here. The sealing mat 1 with the sealing elements 4 is used for sealing test tubes 2 which are arranged in a so-called rack 18 as indicated in FIG. 4 and have a bottom inside 19, a bottom outside 20 and a cylindrical wall 9 with an inside 13. This rack 18 has a corresponding number of continuous openings 26 which usually have a square cross section and each accommodates a test tube 2. These test tubes 2 may be secured in a known way in the rack 18 in a filling position and in a storage position. Likewise these test tubes 2 have a code for identification of samples. Reference is made in this regard to European Patent 0 904 841 A1 (Hoffmann-La Roche AG), which describes a device for handling such racks and test tubes.

The sealing elements 4 have an approximately U-shaped cross section according to FIG. 1 and each sealing element has a round cylindrical wall 10 and a bottom 11. Near the bottom 11, a peripheral sealing bulge 8 is integrally molded on the outside of the wall 10, forming a seal in the wall of the test tube 2. On the top side of the bottom 11, there is a nose 31 which protrudes upward and which is provided for allowing machine removal of the corresponding sealing element 4, as explained below. The sealing bulge 8 which protrudes radially outward is integrally molded on the upper edge of the sealing container [sic] 4 having a ring-shaped top side 14 and a bottom side 16 running parallel to that. When the test tube 2 is sealed, this bottom side 16 sits on an end face 17, also ring-shaped, of the test tube 2.

Figure 2:
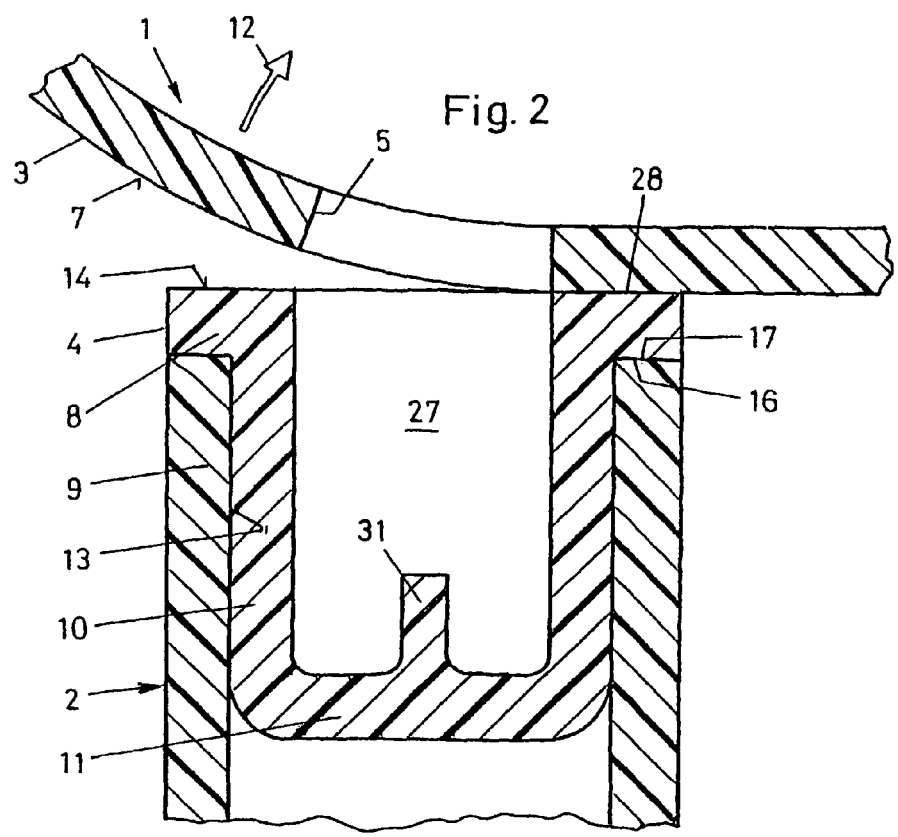
FIG. 2 shows schematically the carrier sheet being pulled away from a sealing element.

A corresponding opening 5 is arranged above the opening 27 in the carrier sheet 3. The ring-shaped flat surface 14 together with a corresponding surface on the bottom side 7 of the carrier sheet 3 forms a connection point 28 which can be released by pulling off the carrier sheet 3 as illustrated in FIG. 2. The adhesive force of this connection point 28 is greater than the holding force of the sealing element 4 in the test tube 2. The carrier sheet 3 may thus be pulled away in the direction of the arrow 12 according to FIG. 2 without removing the sealing element 4 from the test tube 2. After pulling away the carrier sheet 3, the sealing elements 4 thus remain tightly on the corresponding test tubes 2. The connection points 28 are formed by injection molding of the carrier sheet 3 on the sealing elements 4, as is also apparent from the method described below.

Figure 5:
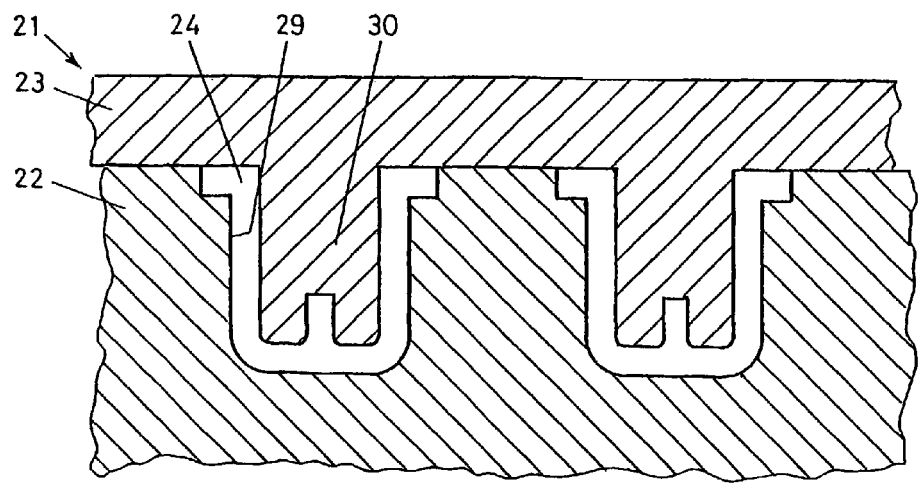
FIG. 5 shows schematically a section through a part of a die mold and FIG. 6 shows a section according to FIG. 5, but after injection of the sealing elements and before injection of the carrier sheet.
Figure 6:
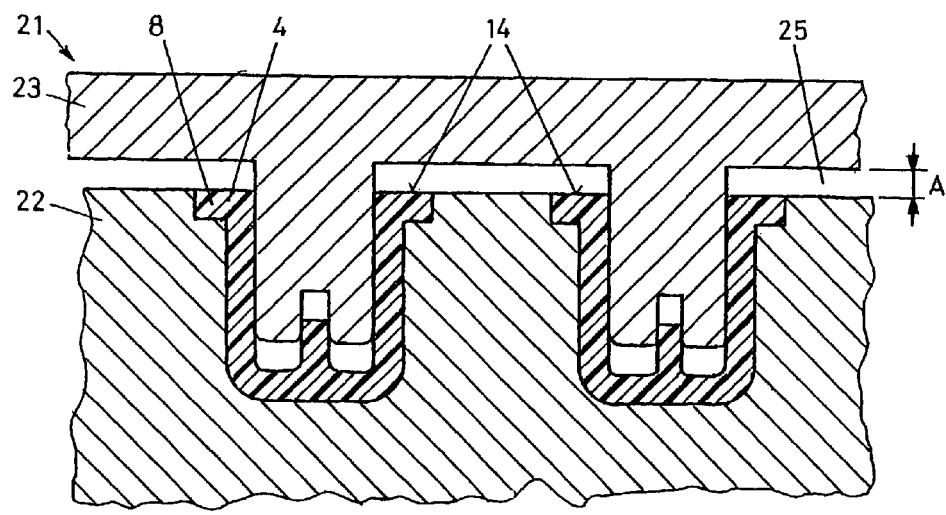

To produce the sealing mat 1, the injection die mold 21, which is merely indicated in FIG. 5 and FIG. 6, is used. It has two mold parts 22 and 23 and two essentially known injection molding units (not shown here). The mold part 23 has shoulders 30, each forming an intermediate space 24 with the mold part 22 in which a sealing element is injected. The plastic used for injecting the sealing elements is preferably polypropylene, polyethylene or an ethylene-vinyl acetate copolymer (EVA).

After injection of the sealing elements 4, the mold part 23 is raised from the mold part 22 in such a way that an interspace 25 of the thickness A is formed. Plastic is injected into this interspace 25 using a second injection molding apparatus (not shown here). This plastic is a thermoplastic elastomer, e.g., SEBS or SBS or a silicone rubber. As FIG. 6 shows, the areas 14 of the flange 8 are facing this interspace 25. On injection of plastic into the interspace 25, this plastic is thus integrally molded onto the flange 8 in the area of the surfaces 14. If the two plastics that are injected with the injection molding units have good wettability, the connection 28 mentioned above is formed on the surfaces 14, its adhesive force depending on the wetting of the selected plastics and the proximity of the molecules of the two partners in the bonding. If the wetting and the proximity of the molecules between these two plastics are great, then this adhesive force will be great accordingly. In the limiting case in which the two plastics are the same, the carrier sheet will be integrally molded onto the sealing elements 4 and in this case the carrier sheet 3 will no longer be detachable from the sealing elements 4. If the wetting and proximity of the molecules of the two plastics are comparatively great, then the adhesive force of the connection 28 will be lower accordingly. Through appropriate choice of the two plastics, thus essentially any desired adhesive force can be achieved. In practice, this adhesive force is selected so that the sealing elements 4 adhere reliably to the carrier sheet 1 for application to the test tubes 2 but at the same time the carrier sheet 3 can be pulled away, as explained above. In a preferred exemplary embodiment, the carrier sheet 3 is made of SEBS or SBS and the sealing elements 4 are made of EVA. However, other combinations of plastics are also conceivable, but it is essential that both the carrier sheet 3 and the sealing elements 4 are made of a rubber elastic plastic. Through a suitable choice of the two plastics, it is thus possible to produce optionally a sealing mat 1 with a removable carrier sheet 3 or a sealing mat in which the sealing elements 4 are fixedly attached to the carrier sheet 3.

If the sealing elements 4 are detachably joined to the carrier sheet 3, then the carrier sheet 3 can be pulled away from the sealing elements 4, as explained above. The test tubes are thus individually tightly sealed with one sealing element 4 each. In the suitable storage position, these test tubes 2 can thus be stored and opened individually as needed. To do so, the sealing elements 4 are each gripped on the nose 26 [sic] using a tool (not shown here) and pulled upward out of the corresponding test tube 2. The holding force of the sealing elements 4 in the test tubes 2, in particular due to the adhesion to the inside 13, is selected in each case so that it is smaller than the holding force of the test tubes 2 in the rack 18. When the sealing elements 4 are pulled out of the test tubes 2, they thus remain in the rack 18. The adhesive force of the connection 28, the holding force of the sealing elements 4 and the holding force of the test tubes 2 in the rack 18 are thus coordinated. The adhesive force 28 may be adjusted essentially continuously and precisely through the choice of the plastics, as explained above.

What is claimed is:

1. Sealing mat comprising:
   a carrier sheet, and
   multiple sealing elements arranged on said carrier sheet, each sealing element being provided for sealing a test tube, wherein the carrier sheet is a first component of a two-component injection molded part, and the multiple sealing elements are a second component of the two-component injection molded part,
   wherein the carrier sheet and the sealing elements are formed of different materials by two-component injection molding, and
   wherein each sealing element has a flat connection on an uppermost edge and is detachably joined to the carrier sheet by adhesion, wherein an adhesive force between the carrier sheet and said flat connection consists of a force based on a proximity of molecules of the two different materials.

2. Sealing mat as claimed in claim 1, wherein the sealing element has a flange protruding outward on said upper edge and the flat connection is formed by an end face of this flange.

3. Sealing mat as claimed in claim 1, wherein the sealing elements are made of polypropylene or polyethylene and the carrier sheet is made of a thermoplastic elastomer.

4. Sealing mat as claimed in claim 1, wherein the carrier sheet and the sealing elements are made of different but related plastics.

5. Sealing mat as claimed in claim 1, wherein the carrier sheet is made of styrene-ethylene/butylene-styrene (SEBS) or styrene/butadiene/styrene (SBS) and the sealing elements are made of ethylene vinyl acetate (EVA).

6. Sealing mat as claimed in claim 1, wherein each sealing element has a nose on the top side of a bottom on which the sealing element can be gripped and pulled away from the test tube.

* * * * *

UNITED STATES PATENT AND TRADEMARK OFFICE
CERTIFICATE OF CORRECTION

PATENT NO. : 8,420,189 B2 Page 1 of 1
APPLICATION NO. : 10/487038
DATED : April 16, 2013
INVENTOR(S) : Buttgen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 734 days.

Signed and Sealed this
First Day of September, 2015

Michelle K. Lee
*Director of the United States Patent and Trademark Office*